US012281507B2

(12) United States Patent
Tatrow

(10) Patent No.: US 12,281,507 B2
(45) Date of Patent: Apr. 22, 2025

(54) APPARATUS AND METHOD FOR INSTALLING A PIVOT GUIDE IN A DOOR SECTION OF A BIFOLD DOOR

(71) Applicant: SHI DESIGNS LLC

(72) Inventor: Scott Tatrow, Bruce Township, MI (US)

(73) Assignee: SHI DESIGNS LLC, Bruce Township, MI (US)

( * ) Notice: Subject to any disclaimer, the term of this patent is extended or adjusted under 35 U.S.C. 154(b) by 92 days.

(21) Appl. No.: 18/370,917

(22) Filed: Sep. 21, 2023

(65) Prior Publication Data

US 2025/0101786 A1 Mar. 27, 2025

(51) Int. Cl.
*E05D 15/26* (2006.01)
*B25B 33/00* (2006.01)
*E05D 7/10* (2006.01)

(52) U.S. Cl.
CPC ............ *E05D 15/266* (2013.01); *B25B 33/00* (2013.01); *E05D 2007/1094* (2013.01); *E05Y 2800/276* (2013.01); *E05Y 2800/278* (2013.01)

(58) Field of Classification Search
CPC .......... E05D 15/266; E05D 2007/1094; E05D 5/127; B25B 33/00; E05Y 2800/276; E05Y 2800/278; B25D 1/12; B25C 3/008
USPC ........................... 173/210; 81/22, 44; 16/254
See application file for complete search history.

(56) References Cited

U.S. PATENT DOCUMENTS

| | | | | | |
|---|---|---|---|---|---|
| 2,635,237 | A * | 4/1953 | Langer | B25C 3/008 | 227/113 |
| 2,934,039 | A * | 4/1960 | Marano | B27F 7/34 | 91/394 |
| 3,187,800 | A * | 6/1965 | Kirby | E05D 15/266 | 160/206 |
| 3,191,214 | A * | 6/1965 | Protzman | E05D 7/0027 | 160/206 |
| 3,233,657 | A * | 2/1966 | Kirby | E05D 15/266 | 160/206 |
| 3,410,330 | A * | 11/1968 | Matyas | E05D 15/266 | 160/206 |
| 3,511,300 | A * | 5/1970 | Matyas | E05D 7/0027 | 16/244 |
| 3,592,257 | A * | 7/1971 | Matyas | E05D 15/266 | 16/244 |
| 3,666,238 | A * | 5/1972 | Weber | B25B 33/00 | 254/131.5 |
| 3,805,324 | A * | 4/1974 | Johnson | E05D 7/0027 | 16/244 |

(Continued)

*Primary Examiner* — William L Miller
(74) *Attorney, Agent, or Firm* — The Dobrusin Law Firm, P.C.

(57) ABSTRACT

An apparatus and method for installing a pivot guide in a door section of a bifold door, the pivot guide including a base, a flange at an upper region of the base, a pin extending into the base, and a top part connected to the pin wherein the apparatus includes: an upper part; a lower part; and a middle part connecting the upper part to the lower part; the lower part has a notch, and during the installing of the pivot guide into the door section, the notch is positioned between the flange and the top part of the pivot guide, and after a force is applied onto the upper part, the force is transferred from the upper part to the lower part through the middle part and onto the flange to push the base into the opening in the door section.

18 Claims, 5 Drawing Sheets

(56) References Cited

U.S. PATENT DOCUMENTS

| | | | | | |
|---|---|---|---|---|---|
| 3,866,658 | A * | 2/1975 | Smith | E05D 15/266 | 16/93 R |
| 3,946,779 | A * | 3/1976 | Sudol | B25C 3/008 | 81/44 |
| 4,004,624 | A * | 1/1977 | Holstein | B25C 9/00 | D8/71 |
| 4,037,632 | A * | 7/1977 | Arena | B25C 3/008 | 227/147 |
| 4,784,025 | A * | 11/1988 | Peck | B25C 3/008 | 81/489 |
| 5,548,869 | A * | 8/1996 | Ryczek | E05D 15/266 | 16/93 R |
| 6,418,590 | B1 * | 7/2002 | Nipper | E05D 15/264 | 16/229 |
| 8,307,514 | B2 * | 11/2012 | Clark, Sr. | E05D 11/00 | 16/386 |
| 8,356,387 | B1 * | 1/2013 | Mattix | E05D 15/266 | 16/382 |
| 2006/0225262 | A1 * | 10/2006 | Federico | E05D 5/127 | 29/257 |
| 2015/0121682 | A1 * | 5/2015 | Brown | B25B 27/14 | 29/527.2 |
| 2016/0144494 | A1 * | 5/2016 | Sorkin | B25B 33/00 | 29/267 |

* cited by examiner

APPARATUS AND METHOD FOR INSTALLING A PIVOT GUIDE IN A DOOR SECTION OF A BIFOLD DOOR

CROSS REFERENCE TO RELATED APPLICATIONS

None.

FIELD

These teachings relate to an apparatus and method for installing a pivot guide in a door section of a bifold door.

BACKGROUND

Bifold doors are typically located in the entry way of a room like a closet or pantry. A typical bifold door includes a pair of door sections that are hingedly connected together and configured to move and pivot relative to each other to move between an open and closed configuration.

Before installing the bifold doors in the entry way, a contractor or homeowner must first install one or several pivot guides in the door sections to enable the door sections to move or pivot during use. This typically involves pushing a base of the pivot guide into a bore defined in the top and/or bottom surface of the door sections. However, because the bore may include burrs from the bore drilling process and/or the bore may have a smaller size than a size of the base to ensure a tight fit, pushing the base into the bore by hand may be challenging. Accordingly, a contractor or homeowner may resort to striking the pivot guide with a blunt object such as a hammer to drive the base into the bore. However, this typically results in the pivot guide breaking. The contractor or homeowner is then forced to either install the bifold doors with the damaged pivot guide(s), which may negatively impact operation of the bifold doors, or purchase one or more replacement pivot guides, which undesirably increases installation time and costs. Accordingly, improvement in the art is highly desired.

SUMMARY

These teachings relate to an apparatus and method for installing a pivot guide in a door section of a bifold door.

DETAILED DESCRIPTION

Figure 1:
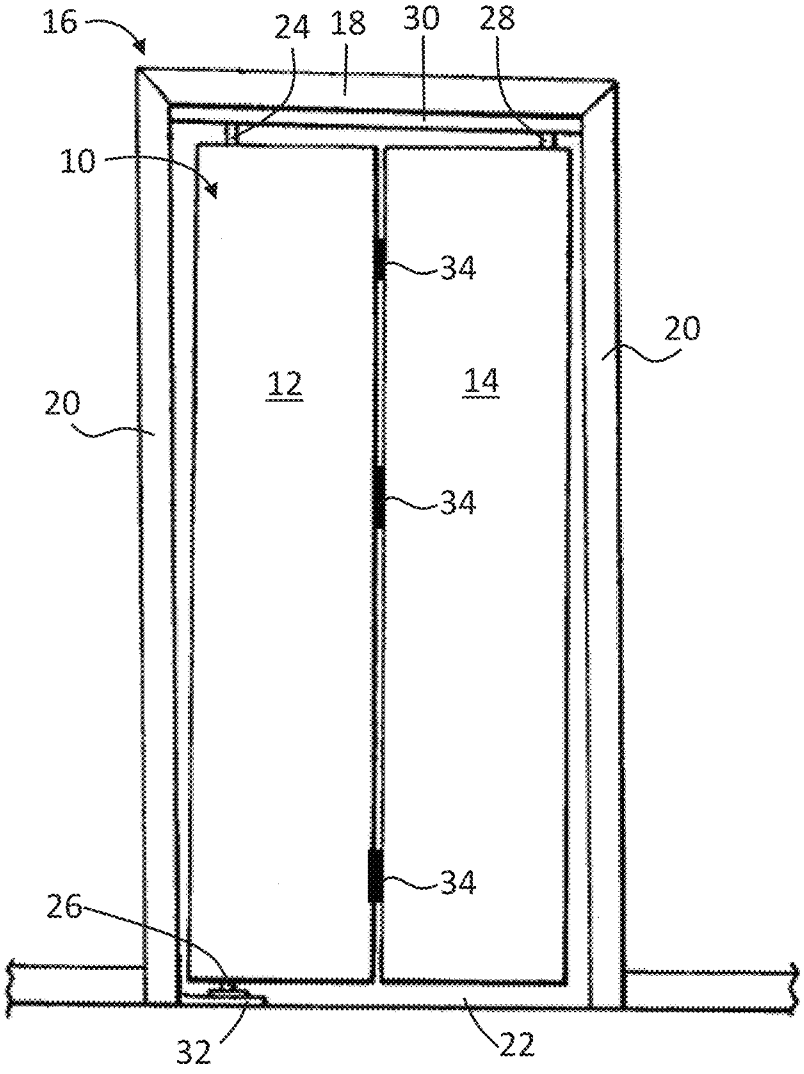
FIG. 1 front view of a bifold door.

FIG. 1 illustrates a bifold door 10 having two door sections 12, 14. The bifold door 10 is installed in a doorway 16 that is defined by a header 18, a pair of opposing jambs 20, and a floor 22.

One of the door sections 12 is supported in the doorway 16 by top and bottom pivot guides 24, 26. The other door section 14 is supported in the doorway 16 by a top pivot guide 28.

The top pivot guides 24, 28 may engage a track 30 that is attached to the header 18. The bottom pivot guide 26 may engage a bracket 32 attached to the floor 22. The two door sections 12, 14 are connected together via one or more hinges 34.

Figure 2A:
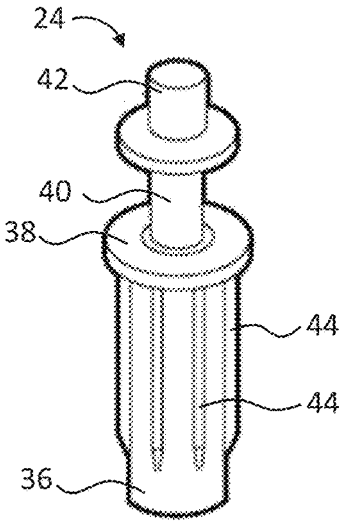
FIG. 2A is a perspective view of an exemplary pivot guide that may be installed in a top of a door section.

FIG. 2A illustrates an exemplary pivot guide 24. The pivot guide 24 may be a top pivot guide because it is intended to be installed at a top surface of part of the door section 12, 14. The pivot guide 24 may include a base 36, a flange 38 located at the top end or region of the base 36, and a pin 40 that extends into the base 36. The pin 40 may be spring loaded such that the pin 40 can be compressed into the base 36 so that a top part 42 that is part of or connected to the pin 40 changes its position relative to the base 36. The base 36 may include one or more ribs or fingers 44 that project outwardly from the base 36 and are radially arranged around the base 36.

Figure 2B:
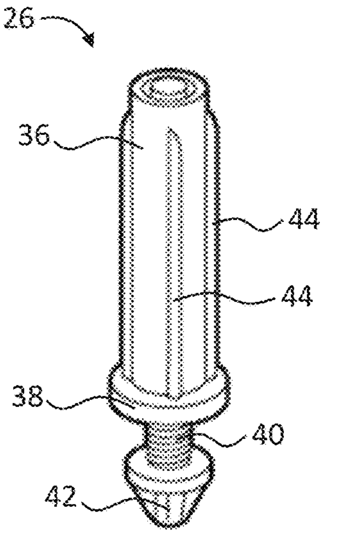
FIG. 2B is a perspective view of an exemplary pivot guide that may be installed in a bottom of a door section.

FIG. 2B illustrates an exemplary pivot guide 26. The pivot guide 26 may be a bottom guide because it is intended to be installed at a bottom surface of part of the door section 12, 14. The pivot guide 26 may include a base 36, a flange 38 located at the bottom end or region of the base 36, and a pin 40 that extends into the base 36. The pin 40 may threadably engage the base 36 such that the pin 40 can be screwed into and out of the base 36 so that a top part 42 that is part of or connected to the pin 40 changes its position relative to the base 36. The base 36 may include one or more ribs or fingers 44 that project outwardly from the base 36 and are radially arranged around the base 36.

Figure 2C:
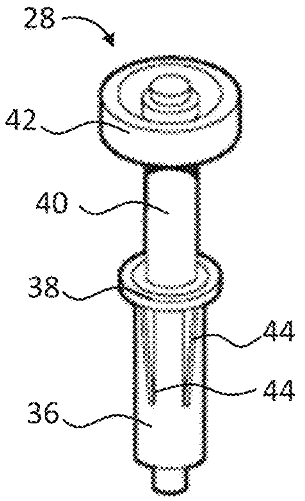
FIG. 2C is a perspective view of an exemplary pivot guide that may be installed in a top of a door section.

FIG. 2C illustrates an exemplary a pivot guide 28. The pivot guide 28 may be a top pivot guide because it is intended to be installed at a top surface of part of the door section 12, 14. The pivot guide 28 may include a base 36, a flange 38 located at the top end or region of the base 36, and a pin 40 that extends into the base 36. The pin 40 may be spring loaded such that the pin 40 can be compressed into the base 36 so that a top part 42 that is part of or connected to the pin 40, which may include a roller, changes its position relative to the base 36. The base 36 may include one or more ribs or fingers 44 that project outwardly from the base 36 and are radially arranged around the base 36.

Figure 3A:
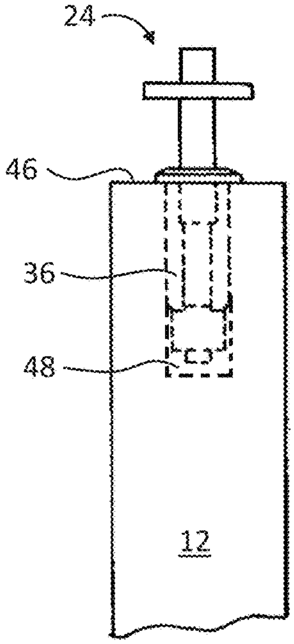
FIG. 3A is a side view of the pivot guide of FIG. 2A installed in a top of a door section of a bifold door.

FIG. 3A illustrates the pivot guide 24 of FIG. 2A installed in the door section 12. The top end 46 of the door section 12 may include an opening or bore 48. The bore 48 may include a depth that is generally the same size (or slightly shorter or longer) than the length of the base 36 of the pivot guide 24. The bore 54 may include a diameter or opening size that is generally the same size or slightly smaller than a diameter of the base 36, including or not including the ribs or fingers 44.

Figure 3B:
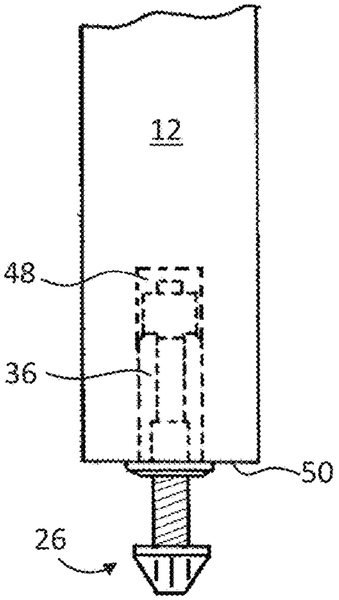
FIG. 3B is a side view of the pivot guide of FIG. 2B installed in a bottom of a door section of a bifold door.

FIG. 3B illustrates the pivot guide 26 of FIG. 2B installed in door section 12. The bottom end 50 of the door section 12 may include an opening or bore 48. The bore 48 may include a depth that is generally the same size (or slightly shorter or longer) than the length of the base 36 of the pivot guide 26. The bore 48 may include a diameter or opening size that is generally the same size or slightly smaller than a diameter of the base 36, including or not including the ribs or fingers 44.

Figure 3C:
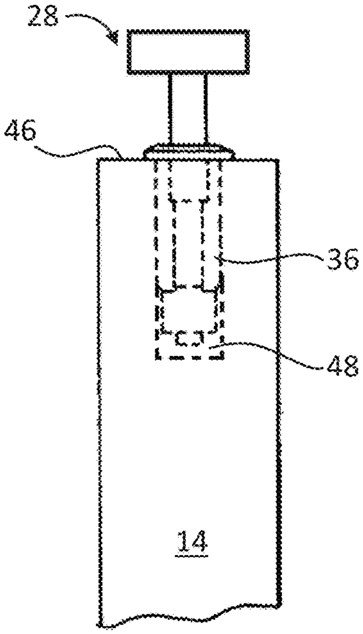
FIG. 3C is a side view of the pivot guide of FIG. 2C installed in a top of a door section of a bifold door.

FIG. 3C illustrates the pivot guide 28 of FIG. 2C installed in door section 14. The top end 46 of the door section 14 may include an opening or bore 48. The bore 48 may include a depth that is generally the same size (or slightly shorter or longer) than the length of the base 36 of the pivot guide 28. The bore 48 may include a diameter or opening size that is generally the same size as or slightly smaller than a diameter of the base 36, including or not including the ribs or fingers 44.

Referring to FIGS. 3A, 3B, and 3C, to install the respective pivot guide 24, 26, 28 into the bore 48 of the door section 10, 12, typically or traditionally, a user (homeowner, contractor, etc.) will grasp the pivot guide and attempt to push or force the base 36 of the pivot guide into the bore 48. However, because the size of the bore 48 is generally the same size or smaller than a size or diameter of the base 36 and/or the bore 48 may include burrs or other obstructions from the bore drilling process, it may be difficult to manually slide, push, or insert the base 36 into the bore 48. Therefore, a user may resort to using a hammer or other object to strike the top part 42 of the pin 40 of the pivot guide to forcibly insert or push the base 36 into the bore 48. However, this may result in the unfortunate breaking or bending of the pivot guide, for example the breaking or bending of the pin 40, the top part 42, and/or the base 36.

Figure 4A:
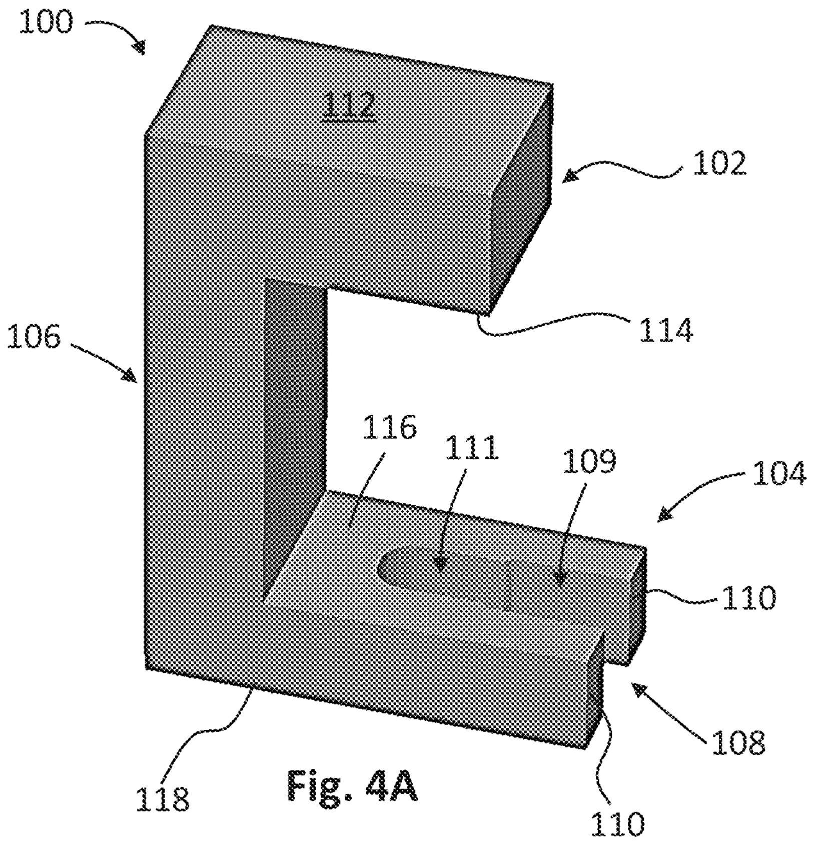
FIG. 4A is a perspective view of the apparatus according to these teachings.
Figure 4B:
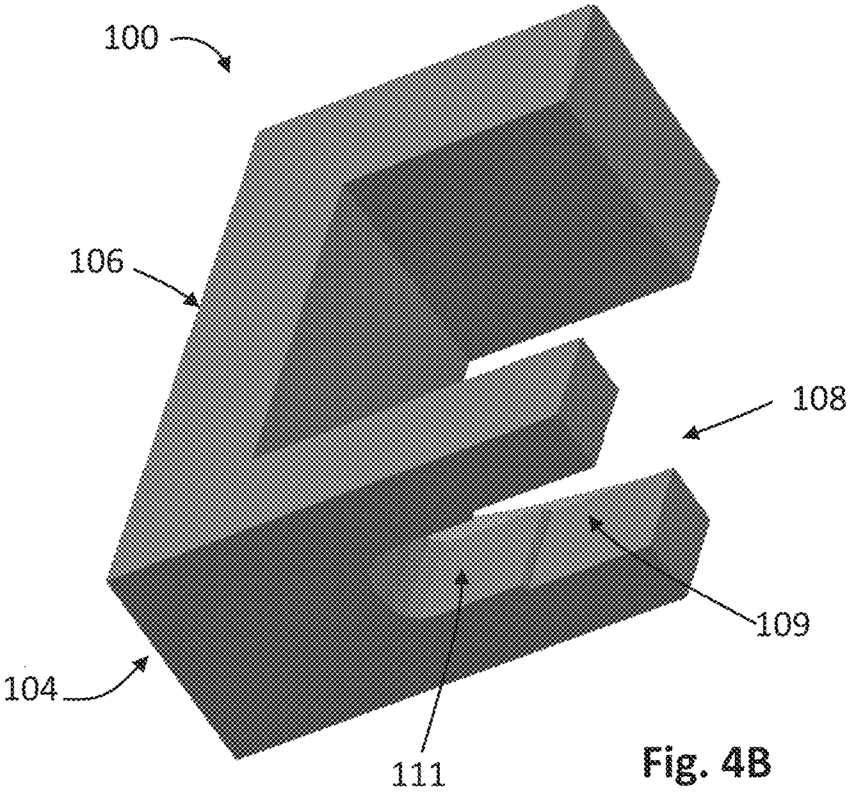
FIG. 4B is a perspective view of the apparatus according to these teachings.

FIGS. 4A and 4B illustrate an apparatus 100 for installing a pivot guide into one or more door sections of a bifold door.

The apparatus 100 generally has a C- or U-shaped profile or section. The apparatus 100 comprises an upper part 102, a lower part 104, and a middle part 106 that connects the upper part 102 to the lower part 104.

The lower part 104 may include a notch or cut out 108. The notch or cut out 108 may be an opening that is defined between a pair of opposing projections or fingers 110. The notch may have a generally C- or U-shape.

The notch or cutout 108 has a first cutout part 109 and a second cutout part 111. The first cutout part 109 may be located at or near the distal ends of the projections or fingers. The second cutout part 111 may be located inboard of the first cutout part 109 and located closer to the middle part 106. The first cutout part 109 has a larger opening or size than the second cut out part 111. In other words, a size, distance, or gap that is defined between the opposing projections or fingers 110 at the first cutout part 109 is larger or wider than a size, distance, or gap that is defined between the opposing projections or fingers 110 at the second cutout part 111. The purpose of this difference in size is to accommodate various sized or diameter of pins 40 of the pivot guides, as will be described below.

The size of the opening notch or cut out 108, or the distance between the pair of projections or fingers 110, may be generally the same size or generally larger than size or a diameter of the pin 40 of any of the pivot guides illustrated and described above at FIGS. 2A-2C.

The size of the notch or cut out 108, or distance between the pair of projections or fingers 110, may be generally smaller than a size or diameter of the flange 38 of any of the pivot guides illustrated and described above at FIGS. 2A-2C.

The size of the notch or cut out 108, or distance between the pair of projections or fingers 110, may be generally smaller, larger or the same size than a size or diameter of the base 36 of any of the pivot guides illustrated and described above at FIGS. 2A-2C.

The upper part 102 may include an upper or outside surface 112 and an opposing lower or inside surface 114. The lower part 104 may include an upper or inside surface 116 that opposes the inside surface 114 of the upper part 102. The lower part 104 may include a bottom or outside surface 118. The distance between the opposing inside surfaces 114, 116 may be larger than a distance between the flange 38 and the top part 42 of each of the pivot guides illustrated and described above at FIGS. 2A-2C.

A length of the upper part 102 extending from the middle part 106 may be shorter than a length of the lower part 104 extending from the middle part 106. Advantageously, this will allow or enable a user to strike or impact the upper part 102 of the apparatus 100 at a location closer to the middle part 106 so the striking force is transferred more directly through the middle part 106 to the lower part 104. If the upper part 102 had a longer length, a vibration or springboard effect may take place if a user strikes the upper part 102 at its distal most end, and may even cause it to break. Also, having a shorter upper part 102 may require less material to manufacture the apparatus 100.

FIGS. 5A, 5B, 5C, 5D, 5E, and 5F illustrate a method 200 of installing a pivot guide into a door section 12, 14 with the apparatus 100 according to these teachings. While the pivot guide in these figures is illustrated as the pivot guide 28 from FIG. 2C, it is understood that the same installation procedure and steps may apply to the other guides 24, 26 illustrated and described above at FIGS. 2A and 2B.

Figure 5A:
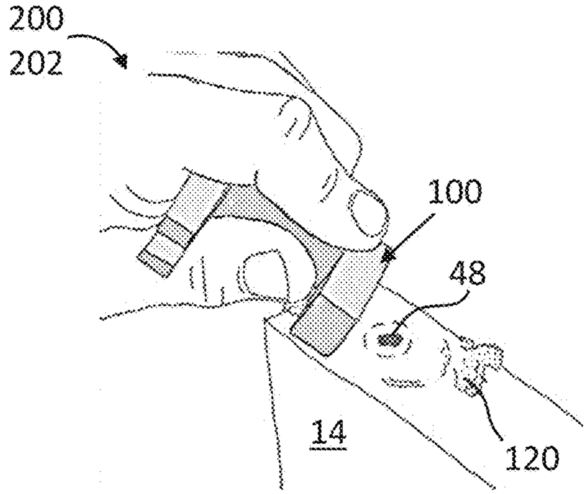
FIG. 5A is a perspective view of a method step associated with installing a pivot guide in a door section of a bifold door using the apparatus according to these teachings.
Figure 5B:
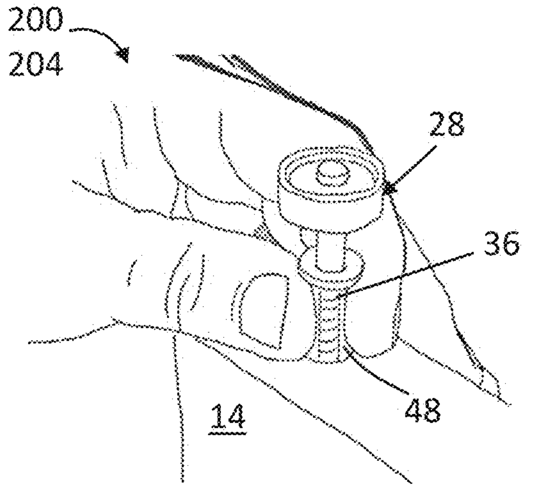
FIG. 5B is a perspective view of a method step associated with installing a pivot guide in a door section of a bifold door using the apparatus according to these teachings.

Referring to FIG. 5A, the method 200 includes a step 202 of using the apparatus 100 to clean, scrape, and or remove excess material or burs 120 from the door section 14 around the bore 48. This excess material may be a result of the door section manufacturing process and/or the bore 48 drilling or milling process.

Referring to FIG. 65B, the method 200 includes a step 204 of aligning the base 36 of the pivot guide 28 with the bore 48 in the top of the door section 14.

Figure 5C:
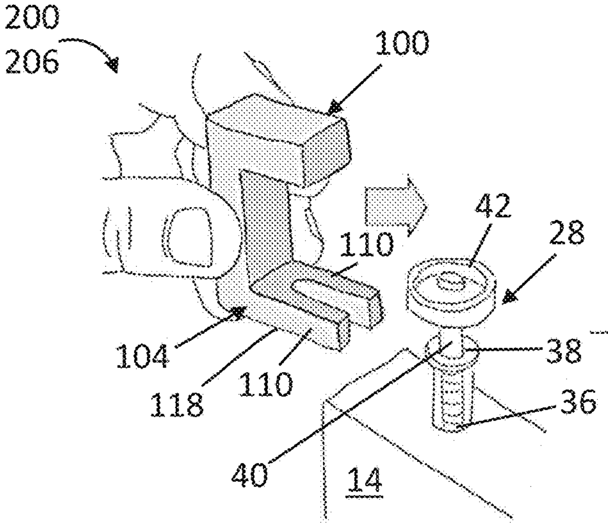
FIG. 5C is a perspective view of a method step associated with installing a pivot guide in a door section of a bifold door using the apparatus according to these teachings.
Figure 5D:
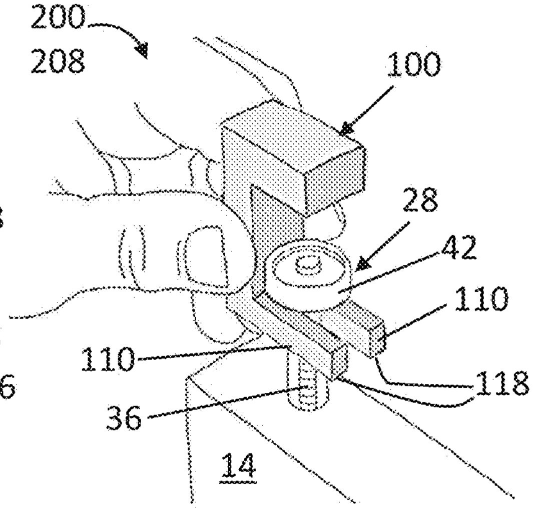
FIG. 5D is a perspective view of a method step associated with installing a pivot guide in a door section of a bifold door using the apparatus according to these teachings.

Referring to FIGS. 5C and 5D, the method 200 includes a step 206 of positioning or aligning the apparatus 100 with the base 36 of the pivot guide 28 such that the lower part 104 or more specifically the projections or fingers 110 of the lower part 104 are positioned between the top part 42 of the pin 40 and the flange 38. The method 200 then includes a step 208 of engaging the pivot guide 28 with the apparatus 100 such that the lower surface 118 of the lower part 104 rests on the flange 38 of the pivot guide 28. During these and/or other steps, the user may grasp the apparatus by holding or grasping the middle part 106, the upper part 102, and/or the lower part 104.

During the positioning step 206 and/or during the aligning step 208, the user may position the pin 40 of the pivot guide in the appropriate cut out part 109, 111 (See FIGS. 4A, 4B). In other words, referring back to FIGS. 4A and 4B, if the pin 40 has a larger size or diameter, then the user may position the apparatus 100 so that the pin 40 is within the first cut out part 109 that has the larger cutout. It may also be the case that the user is unable to position the pin 40 within the second cut out part 111 because the pin 40 diameter or size is simply too big to fit between the opposing projections or fingers in the second cut out part 111. On the other hand, if the pin 40 has a smaller size or diameter, then the pin 40 may fit into the second cut out part 111.

Figure 5E:
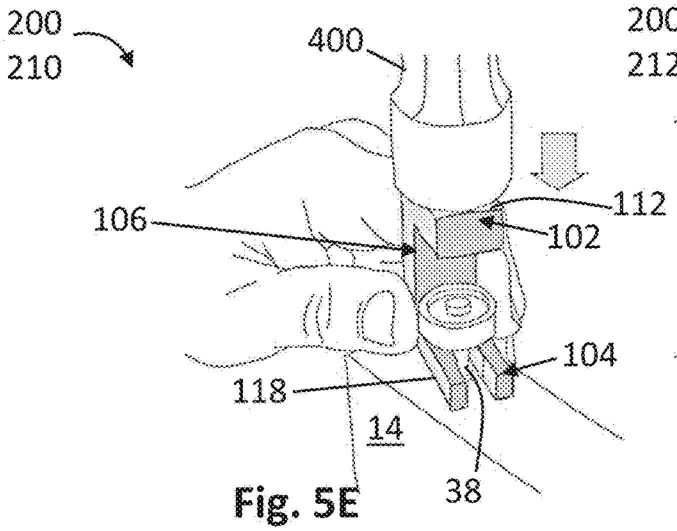
FIG. 5E is a perspective view of a method step associated with installing a pivot guide in a door section of a bifold door using the apparatus according to these teachings.

Referring to FIG. 5E, the method 200 includes a step 210 of applying a force onto the apparatus 100. More specifically, the method may include a step of striking the apparatus 100 with an object 400. Even more specifically, the striking step 210 may include applying a force or a striking force on the upper surface 112 of the upper part 102 with the object 400, which may be a hammer or other blunt object, so that the striking force is transferred from the upper part 102 to the lower part 104 through the middle part 106. Accordingly, the lower surface 118 of the lower part 104 will press or push against the flange 38 and then push, drive, or force the base 36 into the opening or bore 48 in the door section until the flange 38 bottoms out or on the door section 14. Alternatively, a user may apply the force onto the apparatus, the top part 112, the middle part, or the lower part by grasping the apparatus and simply pushing or forcing the apparatus 100 downwardly so that the lower part 110 applies the force or pushing force onto the flange 38 to drive or push the base of the pivot guide into the bore or opening in the door section of the pivot door.

Figure 5F:
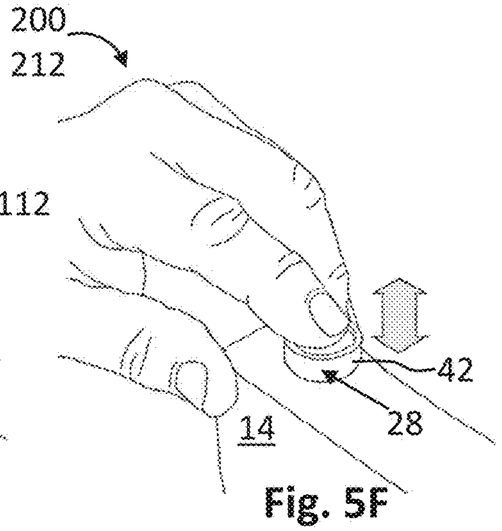
FIG. 5F is a perspective view of a method step associated with installing a pivot guide in a door section of a bifold door using the apparatus according to these teachings.
Figure 6:
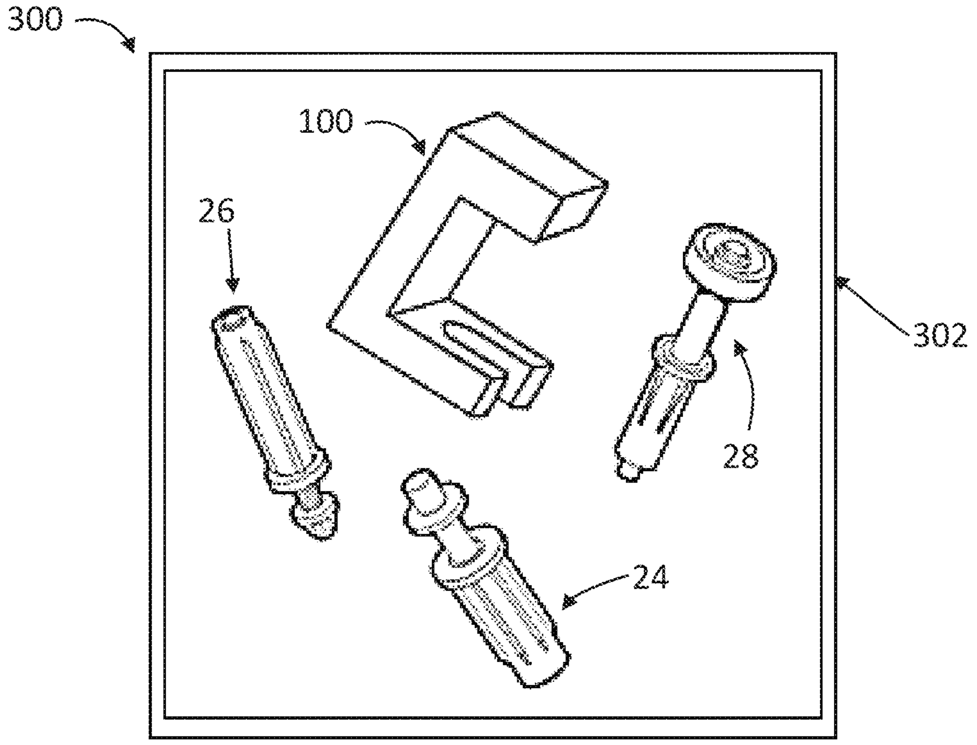
FIG. 6 illustrates a kit, comprising the apparatus according to these teachings and one or more of the pivot guides.

Referring to FIG. 5F, the method 200 may include a step of 212 where the pivot guide 28 is tested for functionality. More specifically, the user may depress and release the top part 42 of the pin to ensure the spring-loaded action of the pivot guide is functional. Of course, if the pivot guide is the one illustrated in FIG. 2B which does not include the spring-loaded pin 40 but instead includes the threaded pin, then a user may spin the pin in a clockwise and counter-clockwise direction relative to the base to ensure that the pin travels towards and away from the door section 14.

Fig. illustrates a kit 300. The kit 300 comprises one or more of the apparatus 100 and one or more of the pivot guides 24, 26, 28. The components of the kit 300 may be contained within a bag or box 302 and may be offered for sale with the bifold doors and/or as an aftermarket or replacement. Of course, in some configurations, the kit 300 may only comprise one or more of the apparatuses 100.

Advantageously, as can be gleaned from the teachings herein, the apparatus 100 may reduce or minimize the breaking or bending of pivot guides during installation into a door section. This is because, rather than hitting the top part 42 of the pin 40 with the object 400, which may cause the top part 42 of the pin 40 to bend or break, the force is applied on to the flange 38 of the pivot guide via the apparatus. It has been shown that by applying the force onto the flange 38 via the apparatus disclosed herein as opposed to the top part 42 of the pin 40, the pivot guides are less prone to breaking and damage. Accordingly, less scrap is generated and cost can be saved by not having to replace the damaged pivot guides with new pivot guides.

The apparatus 100 according to these teachings may be made of a suitable material such as plastic, metal, a composite, or a combination thereof. The apparatus may be made via a plastic injection molding process, a stamping process, a cutting process, a 3D printing process, a casting process, or a combination thereof. The parts of the apparatus (upper part, lower part, middle part, etc.) may be made of a single, integral part or material. The parts of the apparatus (top part, bottom part, middle part, etc.) may be made of two or more parts or materials that are subsequently joined together via one or more fasteners or fastening methods.

The upper part, the middle part, and/or the lower part may include one or more grips, bumps, projections, grooves, knobs, knobs, knobs, or combination thereof that may help a user grip or grasp the apparatus during use. In some configurations, one or more parts of the apparatus may be magnetic so as to assist with holding the pivot guide before or during installation. In some configurations, the notch or cut out may include one or more inwardly projecting grooves or projections or undercuts that may help retain the pin within the notch or cut out before or during use. This may help stabilize the pivot guide in the notch or groove while the user aligns the face during installation. In other words in some configurations come with the method may include a step of engaging the pivot guide with the apparatus and then aligning the base with the bore in the door section.

The bottom part may have a length of approximately 1 to 2 inches, more specifically about 1.5 inches, or even more specifically 1.625 inches. The middle part may have a thickness of approximately 1 inch, or about ½ inch, or about 7⁄16 inch. The upper part may have a length of about 1 inch, or about 2 inches, or about 1.5 inches, or about 1.25 inches. The upper part may have a thickness of about 1 inch, 0.5 inches, or about 0.75 inches. The middle part or the overall apparatus may have a length or height of about 2 inches, about 3 inches, about 2½ inches, or about 2.25 inches.

It is worth nothing that a pivot guide designated as a "top" pivot guide may be used as a "bottom" pivot guide, and vice vera. Moreover, any pivot guide may be installed in any bore (top or bottom part or surface of any door section).

It is understood that any of the method steps disclosed herein can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a bore" does not limit the teachings to a single bore. Instead, for example, disclosure of "a bore" may include "one or more bores."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," "middle" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

LISTING OF REFERENCE NUMERALS

10 Bifold door
12 door section
14 door section
16 doorway
18 header
20 jambs
22 floor
24 top pivot guide
26 bottom pivot guide
28 top pivot guide
30 track
32 bracket
34 hinge
36 base
38 flange
40 pin
42 top part of pin 40
44 ribs or fingers
46 top end of the door section 12, 14
48 bore or opening in door section 12, 14
50 bottom end of the door section 12, 14.
100 apparatus for installing a pivot guide
102 upper part
104 lower part
106 middle part
108 notch or cutout
109 first cut out part
110 projections or fingers
111 second cut out part
112 upper surface of upper part 102
114 lower surface of upper part 102
116 upper surface of lower part 104
118 lower surface of lower part 104
200 method
202 method step
204 method step
206 method step
208 method step
210 method step
212 method step
300 kit
302 bag or box
400 object (hammer)

The invention claimed is:

1. An apparatus for installing a pivot guide in an opening of a door section of a bifold door, the pivot guide comprising a base, a flange located at a top end or region of the base, a pin extending into the base, and a top part connected to the pin, wherein the apparatus comprises:
an upper part;
a lower part comprising a notch; and
a middle part connecting the upper part to the lower part;
wherein the notch is an opening in the lower part that is defined between a pair of projections or fingers, and a size or diameter of the notch or a distance between the pair of projections or fingers is generally larger than a size or diameter of the pin of the pivot guide, and
wherein during the installing of the pivot guide into the door section, the notch is configured to be positioned between the flange and the top part of the pivot guide, and after a force is applied onto the upper part, the force is transferred from the upper part to the lower part through the middle part and onto the flange to push the base into the opening in the door section.

2. The apparatus according to claim 1, wherein the apparatus has a generally C-shape or U-shape.

3. The apparatus according to claim 1, wherein a length of the upper part that extends from the middle part is shorter than a length of the lower part that extends from the middle part.

4. The apparatus according to claim 1, wherein the upper part has a lower or inside surface and the lower part has an opposing upper or inside surface, and a distance between the opposing inside surfaces is larger than a distance between the flange and the top part of the pivot guide.

5. The apparatus according to claim 1, wherein the size of the notch or the distance between the pair of projections or fingers is generally smaller than a size or diameter of the flange of the pivot guide.

6. The apparatus according to claim 5, wherein the size of the notch or the distance between the pair of projections or fingers is generally larger than the size or diameter of the flange of the pivot guide.

7. The apparatus according to claim 1, wherein the notch comprises a first cutout part and a second cutout part, and a size of the first cutout part is different than a size of the second cutout part.

8. The apparatus according to claim 7, wherein the first cutout part has a larger size than the second cutout part; and the first cutout part is located closer to a distal end of the pair of projections or fingers, and the second cutout part is located closer to the middle part of the apparatus.

9. The apparatus according to claim 1, wherein the middle part is configured to be grasped by a user during the installing.

10. The apparatus according to claim 1, where the force is applied onto the upper part by striking the upper part with a hammer or a user pushing on the upper part.

11. The apparatus according to claim 10, wherein the apparatus is made of a plastic injection molded part, a stamped part, or is 3D printed.

12. The apparatus according to claim 1, wherein the upper part, the middle part, and the lower part are a single unitary structure.

13. The apparatus according to claim 1, wherein the upper part, the middle part, and the lower part are two or more structures that are connected together.

14. A method of installing the pivot guide in the door section of the bifold door with the apparatus according to claim 1, wherein the method comprises: positioning or aligning the apparatus with the base of the pivot guide such that the pair of projections or fingers of the lower part are positioned between the top part of the pin and the flange.

15. The method according to claim 14, wherein the method comprises: engaging the pivot guide with the apparatus such that a lower surface of the lower part rests on the flange of the pivot guide.

16. The method according to claim 15, wherein the method comprises: striking an upper surface of the upper part with an object, wherein after the striking step, a striking force is transferred from the upper part to the lower part through the middle part.

17. A kit comprising an apparatus and a pivot guide, the apparatus is configured for installing the pivot guide in an opening of a door section of a bifold door, the pivot guide comprises a base, a flange located at a top end or region of the base, a pin extending into the base, and a top part connected to the pin, the apparatus comprises, an upper part, a lower part comprising a notch; and a middle part connecting the upper part to the lower part; wherein during the installing of the pivot guide into the door section, the notch is positioned between the flange and the top part of the pivot guide, and after a force is applied onto the upper part, the force is transferred from the upper part to the lower part through the middle part and onto the flange to push the base into the opening in the door section.

18. An apparatus for installing a pivot guide in an opening of a door section of a bifold door, the pivot guide comprising a base, a flange located at a top end or region of the base, a pin extending into the base, and a top part connected to the pin, wherein the apparatus comprises:

an upper part;

a lower part comprising a notch; and a middle part connecting the upper part to the lower part;

wherein during the installing of the pivot guide into the door section, the notch is positioned between the flange and the top part of the pivot guide, and after a force is applied onto the upper part, the force is transferred from the upper part to the lower part through the middle part and onto the flange to push the base into the opening in the door section;

wherein the apparatus has a generally C-shape or U-shape;

wherein a length of the upper part that extends from the middle part is shorter than a length of the lower part that extends from the middle part;

wherein the notch comprises a first cutout part and a second cutout part, the first cutout part has a larger size than the second cutout part, the first cutout part is located closer to a distal end of a pair of projections or fingers of the lower part, and the second cutout part is located closer to the middle part of the apparatus; and wherein the upper part has a lower or inside surface and the lower part has an opposing upper or inside surface, and a distance between the opposing inside surfaces is larger than a distance between the flange and the top part of the pivot guide.

* * * * *